United States Patent [19]
Gwilliam

[11] 3,762,560
[45] Oct. 2, 1973

[54] TUBE PRESSURE FILTERS

[75] Inventor: Ralph Derek Gwilliam, Cornwall, England

[73] Assignee: English Clays Lovering Pochin & Company Limited, Cornwall, England

[22] Filed: May 24, 1971

[21] Appl. No.: 146,016

[30] Foreign Application Priority Data
June 3, 1970 Great Britain.................. 26,902/70

[52] U.S. Cl.................. 210/350, 100/211, 210/411
[51] Int. Cl............................................ B01d 29/00
[58] Field of Search.................... 210/225, 232, 350, 210/497.1, 498, 456, 247, 483–488, 106, 108, 407, 356, 411, 392, 455, 412, 49; 162/116; 209/273; 100/211

[56] References Cited
UNITED STATES PATENTS

| | | | |
|---|---|---|---|
| 18,968 | 10/1933 | Willers............................ | 210/497.1 |
| 1,565,988 | 12/1925 | Cottrell............................ | 210/350 |
| 3,350,260 | 10/1967 | Johnson........................... | 162/116 |
| 3,549,742 | 12/1970 | Benz................................ | 162/116 X |
| 2,592,104 | 4/1952 | Arakelian........................ | 210/488 |

FOREIGN PATENTS OR APPLICATIONS 854,465  10/1970  Canada............................. 210/350

*Primary Examiner*—Samih N. Zaharna
*Assistant Examiner*—T. A. Granger
*Attorney*—Larson, Taylor & Hinds

[57] ABSTRACT

A filter element for a tube pressure filter in which the filter element is divided longitudinally into permeable and impermeable sections to facilitate the discharge therefrom of filter cakes containing fibrous solids.

8 Claims, 3 Drawing Figures

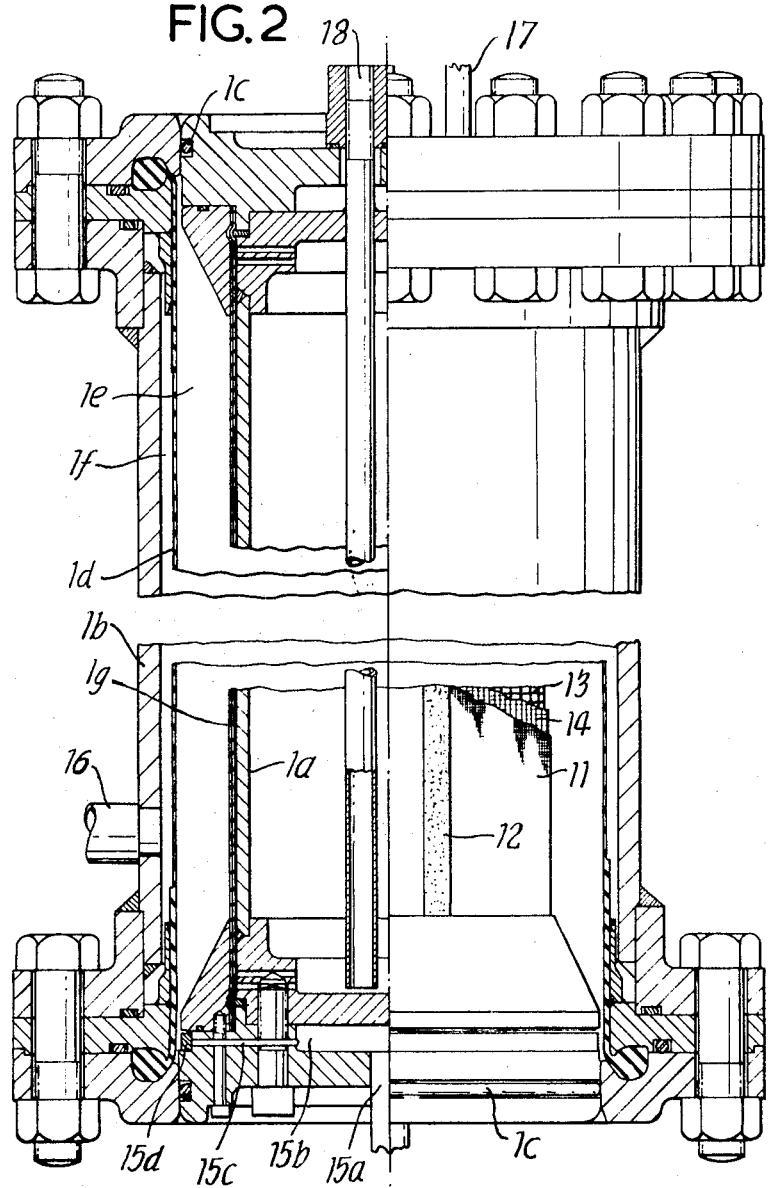

TUBE PRESSURE FILTERS

BACKGROUND OF THE INVENTION

This invention relates to tube pressure filters and more particularly is concerned with a filter element suitable for use in a tube pressure filter and with a tube pressure filter incorporating the same.

There have been described, for example in British Pat. Specification No. 907,485 and in Canadian Pat. Specification No. 854,465, tube pressure filters suitable for reducing the liquid content of slurries or other mixtures of liquids and particulate solid materials. These tube pressure filters essentially comprise an upright annular chamber formed between two co-axially disposed tubular bodies, the annular chamber being divided into inner and outer non-intercommunicating compartments by an impermeable elastic sleeve secured to one of the tubular bodies. The tubular bodies are displaceable axially relative to one another between first and second positions, the arrangement being such that in the first of said first and second positions of the tubular bodies a material to be pressure filtered can be introduced into a compartment formed between one side of the impermeable elastic sleeve and one of the tubular bodies, said one tubular body supporting a filter element, and a hydraulic fluid can be introduced into the compartment formed between the other side of the elastic sleeve and the other tubular body so as to compress the material to be pressure filtered against the filter element. Thereafter evacuation of the hydraulic fluid and displacement of the tubular bodies to the second of their first and second positions enables the solid material from which liquid has been expressed to be discharged. The filter elements used in such tube pressure filters may comprise a filter cloth in the form of a sleeve of filter material, the filter cloth preferably being supported on a wire mesh sleeve which is itself supported by one of the tubular bodies.

Generally, the tube pressure filter is constructed so that the filter element is supported by the inner tubular body and the impermeable elastic sleeve is secured by its ends to the outer tubular body. With this arrangement, a material to be pressure-filtered is introduced into the inner compartment and a hydraulic fluid is introduced into the outer compartment so as to distend the elastic sleeve and thus compress the material in the inner compartment and form a cake of the solid material on the filter element, the filtrate being expressed through the filter element and passing out of the tube pressure filter, for example via apertures formed in the inner tubular body. One method of discharging the filter cake which forms on the filter element involves applying one or more blasts of gas, usually air, to the downstream side of the filter element. When pressure-filtering slurries, or other mixtures of liquids and solids in which the solid material is of a non-fibrous nature, e.g., clays, calcium carbonates, etc., the filter cake cracks readily under the influence of the blasts of gas and discharge of the filter cake in this manner is readily achieved. However, when pressure-filtering mixtures of liquids and solid materials in which the solid material comprises matter of a fibrous nature, e.g., sewage sludge or paper pulp, there is a tendency for the solid material to form a filter cake which is reluctant to crack and cannot, therefore, fall away from the filter cloth because it is impeded by various parts of the inner tubular body.

It is an object of the present invention to provide a filter element for a tube pressure filter which filter element facilitates the discharge of a filter cake of fibrous solids from the tube pressure filter.

It is another object of the present invention to provide a tube pressure filter suitable for use in the treatment of mixtures of liquids and solids in which the solid material comprises matter of a fibrous nature.

SUMMARY OF THE INVENTION

Accordingly, one aspect of the present invention provides a filter element for use in a tube pressure filter which filter element is of tubular shape and is divided longitudinally into alternate permeable and impermeable sections.

According to another aspect of the present invention there is provided a tube pressure filter which essentially comprises a pair of generally coaxial tubular bodies arranged one within the other and adapted to be supported in a generally upright position, an impermeable elastic sleeve disposed within and secured to the outer tubular body, a filter element disposed around and supported by the inner tubular body, outlet means for the discharge of filtrate which has passed through the filter element and through apertures in the inner tubular body from the interior of the inner tubular body, and means for displacing the tubular bodies axially relative to one another between first and second positions, wherein the arrangement is such that in the first position of said tubular bodies they co-operate with each other to define a closed annular chamber which is divided into generally coaxial and non-intercommunicating inner and outer compartments by said impermeable elastic sleeve, the inner compartment having an inlet for a wet, particulate solid material and the outer compartment having an inlet for a hydraulic fluid under pressure, and in the second position of said tubular bodies said annular chamber is open to enable particulate solid material to be discharged from the inner compartment, and wherein the filter element is divided longitudinally into alternate permeable and impermeable sections.

With a filter element in accordance with the present invention filtrate cannot pass through the impermeable sections of the filter element so that either no filter cake or a weakly bound filter cake is formed on these sections, and, when blasts of air or other gas are applied to the downstream side of the filter element, the filter cake can fall away in strips.

DESCRIPTION OF THE PREFERRED EMBODIMENTS

Figure 1:
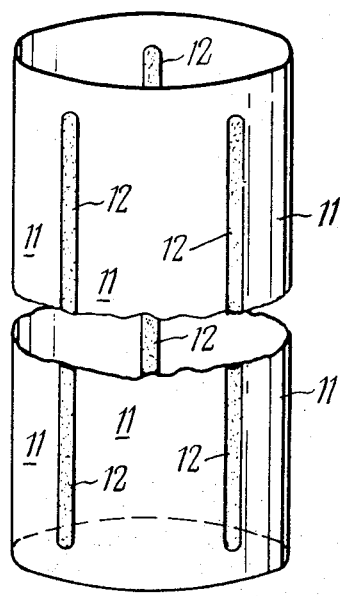

In one embodiment of the invention, the filter element comprises a filter cloth in the form of a sleeve of filter material which sleeve is divided longitudinally into alternate permeable and impermeable sections. The impermeable sections can be formed, for example, by applying to sections of the sleeve of filter material a dope or an impermeable sticking tape. A suitable sticking tape can be formed either from a natural or synthetic rubber or plastics material in the form of a sheet or film or from a textile material impregnated with an adhesive which also seals the pores of the textile material. Alternatively, the impermeable sections can be formed from strips of metal or of rigid or semi-rigid plastics material which are fastened to the filter cloth by means of staples, rivets or similar fastening means. Advantageously, the sleeve of filter material is supported on a wire mesh sleeve which is preferably constructed as described in Belgian Pat. Specification No. 752,207. Optionally, a coarse-weave backing cloth is interposed between the sleeve of filter material and the wire mesh sleeve.

In another embodiment of the invention, the tubular filter element is provided with impermeable sections by attaching strips of metal or of rigid or semi-rigid plastics material to a wire mesh sleeve or to a coarse-weave backing cloth by means of staples, rivets, or similar fastening means, and covering the wire mesh sleeve and backing cloth with a sleeve of filter material. The metal strips or strips of plastics material may alternatively or additionally be held in place by annular bands positioned at least one at each end of the tubular filter element and preferably also at intervals along the length of the tubular filter element.

Generally, the filter element of the present invention should be divided into at least three permeable sections separated by three impermeable sections. The width of the impermeable sections should preferably be at least twice the thickness of the filter cake which it is intended should be formed on the permeable sections. Generally, the impermeable sections will be at least 10 mm wide.

Preferably, the internal wall of inner tubular body defines a substantially closed chamber and the tube pressure filter is provided with means for producing a plurality of short, discrete air blasts within said substantially closed chamber, the air blasts passing through apertures in the inner tubular body to the downstream side of the filter element whereby solid material can be discharged from the surface of the filter element.

Advantageously, the tube pressure filter is constructed and operated generally as described in Canadian Pat. Specification No. 854,465. With tube pressure filters of this kind the inlet of the inner compartment of the tube pressure filter comprises inlet means adapted to deliver a wet particulate solid material to be pressure filtered to the bottom of the inner compartment and to distribute it substantially uniformly around the inner tubular body when the tubular bodies are supported in a generally upright position and are in their first position.

Figure 3:
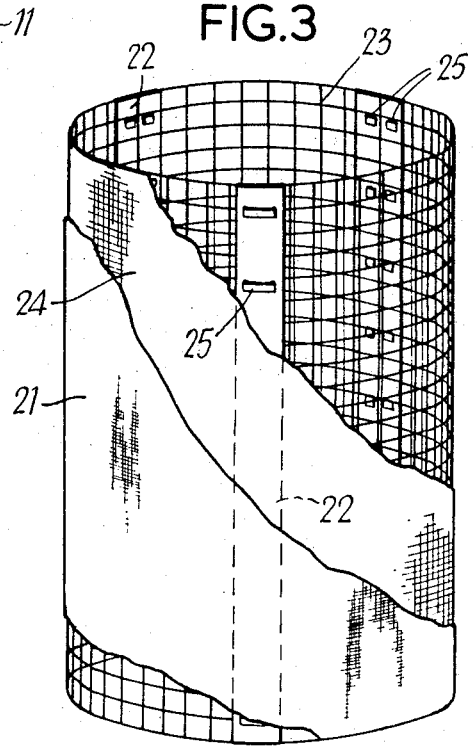

For a better understanding of the invention, and to show how the same may be carried into effect, reference will now be made, by way of example to the accompanying drawings in which:

FIGS. 1 and 3 show two embodiments of a filter element according to the invention; and FIG. 2 shows a tube pressure filter incorporating a filter element according to the invention.

Referring first to FIGS. 1 and 2, the tube pressure filter comprises an inner tubular body 1a and an outer tubular body 1b, which in their first, operative position (as shown in FIG. 2) define between them an annular chamber (1e and 1f), which is sealed at each end by sealing means 1c, mounted on the inner tubular body 1a. An impermeable elastic sleeve 1d is disposed within and is secured by its ends to the outer tubular body 1b, and defines with the tubular bodies inner and outer non-intercommunicating compartments 1e and 1f, respectively. The inner tubular body 1a has an inlet 15a which enables a slurry to be fed under pressure via chamber 15b and a plurality of ducts 15c to the inner compartment 1e, the pressure of the slurry expanding an elastomeric ring 15d which normally closes the ends of the ducts 15c. A filter element 1g is disposed around and is supported by the inner tubular body 1a. An inlet 16 is provided in the outer compartment 1f for hydraulic fluid under pressure. The inner tubular body is also provided with apertures for the passage therethrough of filtrate, with an inlet 17 for feeding compressed air to the inside of the inner tubular body and thence to the downstream side of the filter element, with a siphon tube 18 for removing filtrate from the interior of the inner tubular body, and with a jack (not shown) for displacing the tubular bodies axially relative to one another between their first and second positions.

The filter element 1g comprises a sleeve of filter material 11, a coarse-weave backing cloth 14 and a wire mesh sleeve 13. The sleeve of filter material has three impermeable sections 12. The sleeve of filter material 11 is shown diagrammatically in FIG. 1 and was prepared from three strands of 125 denier, continuous monofilament poly(ethylene terephthalate), TERYLENE, yarn. The strands were woven into a sleeve having a circumference of 54.5 centimetres and a weight of 340 grams per square metre. The sleeve of filter material was divided longitudinally into three sections at 18.17 centimetres centres; and at these centres the filter cloth was rendered impermeable to a width of 16 millimetres by impregnating the filaments of the filter cloth with a dope comprising solvent-based elastomeric adhesive, e.g., EVOSTICK impact adhesive, diluted with toluene. The impermeable sections terminate about 2 inches from each end of the sleeve of filter material as the latter is covered at its ends by fairings.

In operation, a tank containing a slurry of particulate solid material to be treated is connected to the inlet 15a of the tube pressure filter by a pump which feeds into the inner compartment 1e the material to be pressure filtered. The inlet 16, which is formed in the outer tubular body of the tube pressure filter, is connected to a high-pressure pump and to a reversible low-pressure/vacuum pump. The high and low-pressure pumps draw hydraulic fluid from a storage tank and feed it into the outer compartment 1f. The inlet 16 is also connected direct to the storage tank. Hydraulic fluid can be drained from the outer compartment 1f and returned to the storage tank by means of the reversible low-pressure/vacuum pump, the elastic sleeve 1d thereby being dilated against the wall of the outer tubular body. The conduits connecting the various parts of the apparatus are provided with valves to enable the ancillary equipment to be brought into operation at the correct time.

Initially, the rubber sleeve 1d is dilated against the interior wall of the outer tubular body and the compartment 1e is empty. A small quantity of the hydraulic fluid is then fed into outer compartment 1f between the elastic sleeve 1d and the inner wall of the outer tubular body. A charge of the material to be pressure filtered is then fed through inlet 15a via chamber 15b and ducts 15c into inner compartment 1e between the elastic sleeve 1d and the inner tubular body. This effects a scouring operation on the lower portion of the filter element 1g by removing any solid material remaining from a previous operation of the pressure filter. During this scouring operation, more hydraulic fluid is pumped at a low pressure into compartment 1f. This reduces the volume of inner compartment 1e until it is completely filled with feed material. Filtration is allowed to proceed at the low pressure until the flow of filtrate has substantially stopped, at which time the high pressure pump is brought into operation to feed hydraulic fluid into the compartment 1f under a higher pressure. At the same time the filtrate passing into the interior of the inner tubular body is extracted through the siphon tube 18. When the filtration stage has finished, the supply of hydraulic fluid is shut off and the compartment 1f is drained under vacuum. When the compartment 1f has been drained and the elastic sleeve 1d has been dilated against the inner wall of the outer tubular body, the inner tubular body is lowered by means of a jack so that the tubular bodies are moved to their second, inoperative position and the filter cake formed on the filter element 1g is discharged by introducing compressed air through pipe 17 to the downstream side of the filter element. As the filter element is provided with impermeable sections which extend the length of the inner compartment, the filter cake, even when formed from fibrous materials, breaks into strips and discharges readily. When the discharge of the filter cake has been completed, the inner tubular body is raised to its former position and the cycle can begin again. In the operation of the tube pressure filter, the amount of feed material introduced into the inner compartment is such that the filter cake formed on the filter cloth has a thickness of about 8 millimetres.

An alternative form of filter element is shown in FIG. 3 where the impermeable sections of the filter element are formed by securing to a wire mesh sleeve 23, by means of staples 25, three rigid, or semi-rigid, metal strips 22. The wire mesh sleeve is then covered by a coarse weave backing cloth 24 which in turn is covered by a sleeve 21 of filter material. The backing cloth 24 and sleeve 21 of filter material are shown partly broken away for ease of understanding.

I claim:

1. In a tube pressure filter comprising a pair of generally coaxial tubular bodies arranged one within the other and adapted to be supported in a generally upright position, an impermeable elastic sleeve disposed within and secured to the outer tubular body, a filter element disposed around and supported by the inner tubular body, outlet means for the discharge from the interior of the inner tubular body of filtrate which has passed through the filter element and through apertures in the inner tubular body, and means for displacing the tubular bodies axially relative to one another between first and second positions, wherein the arrangement is such that in the first position of said tubular bodies they cooperate with each other to define a closed annular chamber which is divided into generally coaxial and non-intercommunicating inner and outer compartments by said impremeable elastic sleeve, the inner compartment having an inlet for a wet, particulate solid material and the outer compartment having an inlet for a hydraulic fluid under pressure, and in the second position of said tubular bodies said annular chamber is open to enable particulate solid material in the form of a filter cake to be discharged from the inner compartment, the improvement comprising means dividing said filter element longitudinally into alternate permeable and substantially impermeable sections, whereby the filter cake formed on said filter element is divided into corresponding sections providing weakened areas at said corresponding impermeable sections to facilitate the removal of filter cake from said filter element.

2. A tube pressure filter as claimed in claim 1, wherein the filter element comprises a sleeve of filter material supported on a wire mesh sleeve and wherein said sleeve of filter material comprises permeable sections of filter material alternating with impermeable sections, the permeable and impermeable sections being disposed longitudinally of said filter element.

3. A tube pressure filter as claimed in claim 1, wherein the filter element comprises a sleeve of filter material supported on a wire mesh sleeve and wherein strips of an impermeable material are attached to the wire mesh sleeve so as to extend longitudinally thereof and form said impermeable sections of the filter element.

4. A tube pressure filter as claimed in claim 3, wherein said strips of impermeable material are selected from the group consisting of strips of metal, strips of rigid plastics material and strips of semi-rigid plastics material.

5. A tube pressure filter as claimed in claim 1, wherein each of the impermeable sections of the filter element has a width of at least 10 mm but substantially less than the width of the adjacent permeable sections.

6. A tube pressure filter as claimed in claim 1, wherein there are at least 3 permeable sections separated by a corresponding number of impermeable sections.

7. A tube pressure filter as claimed in claim 1, wherein the filter element comprises a sleeve of filter material supported on a wire mesh sleeve and wherein said sleeve of filter material comprises permeable sections of filter material alternating with impermeable sections, each impermeable section consisting of filter material impregnated and sealed with a material which renders the filter material substantially impermeable, the permeable and impremeable sections being disposed longitudinally of said filter element.

8. A tube pressure filter as claimed in claim 1, wherein the filter element comprises a sleeve of filter material supported on a wire mesh sleeve and wherein said sleeve of filter material comprises permeable sections of filter material alternating with impermeable sections, each impermeable section consisting of said filter material covered with a substantially impermeable adhesive tape, the permeable and impermeable sections being disposed longitudinally of said filter element.

* * * * *